July 6, 1965 D. B. LAWHON 3,193,701
MONOSTABLE FLIP-FLOP CONSUMING CURRENT ONLY DURING PULSE FORMING
Filed Jan. 25, 1962
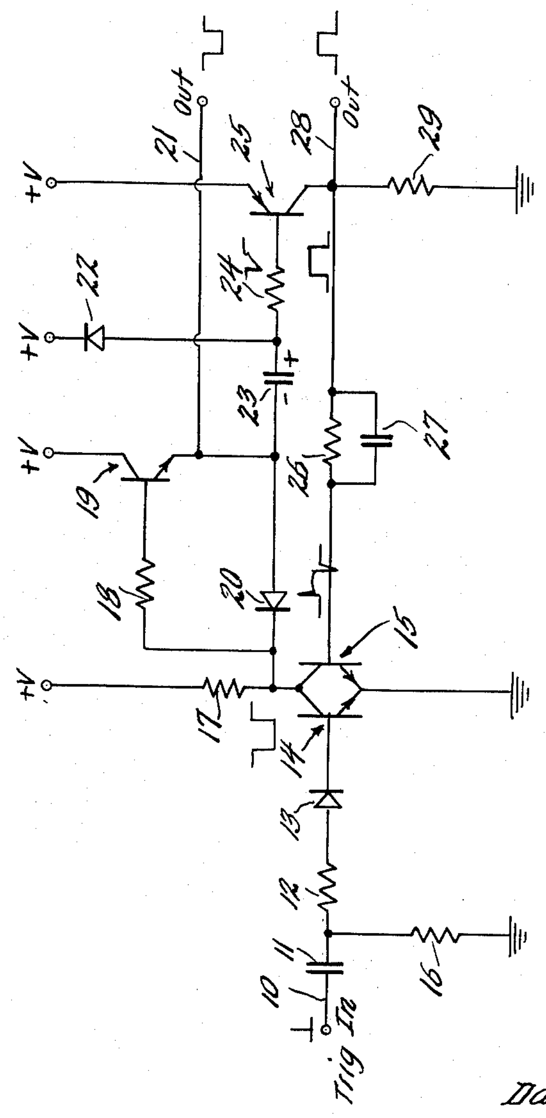
INVENTOR
Davie B. Lawhon,
BY Paris, Haskell & Levine,
ATTORNEYS United States Patent Office 3,193,701
Patented July 6, 1965

3,193,701
MONOSTABLE FLIP-FLOP CONSUMING CURRENT ONLY DURING PULSE FORMING

Davie B. Lawhon, Warminster, Pa., assignor, by mesne assignments, to United Aircraft Corporation, a corporation of Delaware Filed Jan. 25, 1962, Ser. No. 168,708
11 Claims. (Cl. 307—88.5)

The invention relates to improvements in monostable flip-flop circuits, commonly referred to as one shot multivibrators, and is particularly concerned with reducing the power consumption of such circuits.

It is accordingly a principal object of the invention to provide an improved one shot multivibrator circuit that consumes electrical current only during the interval of producing a constant volt-time output impulse.

Other objects and many additional advantages will be apparent to those skilled in the art after a detailed consideration of the following specification taken with the accompanying drawing illustrating one preferred embodiment of the invention.

Referring now to the drawing, the preferred circuit is adapted to respond to each short duration sharp edged trigger spike pulse on its input line 10 to produce a pair of opposite polarity square wave output pulses over output lines 21 and 28, both having constant and uniform volt-time area and substantially perpendicular rising edges and trailing edges, as shown.

Each positive trigger impulse is initially differentiated by capacitor 11 and resistor 16 and introduced through resistor 12 and one way diode 13 to the base electrode of transistor 14 immediately drawing current through the transistor collector and emitter electrodes and producing a depressed voltage at the collector due to the voltage drop through resistor 17. This depressed voltage or negative pulse is conveyed through series connected diode 20, capacitor 23 and resistor 24 to the base electrode of an opposite type transistor 25, whereby the negative pulse causes current flow through the emitter-collector electrodes thereof to produce a positive voltage pulse across resistor 29. A portion of this negative pulse is stored on series capacitor 23 to produce an exponentially decaying negative signal at the base of transistor 25.

The positive going impulse produced at the collector electrode of transistor 25 is thence directed backwardly in feedback relation to the base electrode of a transistor 15, which as shown is provided with its collector and emitter electrodes in parallel with those of transistor 14. Consequently due to this feedback connection, current flow is continued through resistor 17 due to the conduction of current by transistor 15 after the input trigger spike has disappeared. For the purpose of producing vertical leading and trailing edges on the output pulse, a differentiating type circuit including a parallel connected resistor 26 and capacitor 27 is also provided in the feedback path between the collector of transistor 25 and the base of transistor 15. As a result sharp edged spikes are produced at the leading edges and trailing edges of the feedback pulses being directed to the base of transistor 15.

The feedback operation of the circuit as described above is continued for a fixed time duration after the input spike pulse has disappeared, until the capacitor 23 has become substantially fully charged to the negative potential existing at the collector of transistors 14 and 15 whereupon the transistor 25 ceases to conduct current and the voltage drop across resistor 29 returns to ground. The abrupt decay of the positive pulse across resistor 29 results in a sharp edged negative feedback spike pulse at the base of transistor 15 thereby immediately cutting off current conduction therethrough. This raises the potential at the collector electrode thereof to its initial value terminating the output pulse on line 21.

The increase or return of the potential at the collector of transistors 14 and 15 to its positive value is directed to the base electrode of transistor 19, permitting current flow therethrough which enables the capacitor 23 to be discharged through the properly poled diode 22 and the conducting transistor 19 thereby resetting the circuit to respond to the next input trigger. As is believed evident, during the production of the output pulse, the transistor 19 is maintained nonconducting by the negative potential at its base to prevent premature discharge of capacitor 23.

The first output pulse over line 21 is obtained from the emitter electrode of transistor 19 which is maintained at a constant negative potential during operation of the circuit due to the voltage drop across resistor 17. The second output pulse on line 28 is oppositely maintained positive during operation of the circuit due to the constant voltage drop across resistor 29.

The circuit as described above requires very little power due to the fact that the transistors 14, 15, and 25 are normally maintained in a nonconducting condition and only draw current during the time interval that the circuit is functioning in response to an input trigger spike.

Although but one preferred embodiment of the invention has been illustrated and described, it is believed evident that variations may be made by those skilled in the art without departing from the spirit and scope of this invention. Accordingly, this invention should be considered as being limited only according to the following claims.

What is claimed is:

1. A one shot multivibrator comprising a pair of switching transistors of like conductivity type each having a pair of primary current conducting electrodes and a control electrode, said transistors having their primary current conducting electrodes connected in parallel and their control electrodes connected for separate energization, said pair of transistors being normally biased for nonconducting condition between their current conducting electrodes, a third switching transistor of opposite conductivity type and having a pair of current conducting electrodes and a control electrode, said third switching transistor being normally biased into nonconducting condition between its current conducting electrodes, means responsive to conduction by either one of the transistors of the pair for rendering said third transistor conducting and means including a capacitor interconnecting said control electrode of said third switching transistor with one of the primary current conducting electrodes of the pair of switching transistors, means for energizing said control electrode of one of the pair of transistors by an incoming pulse to render that switching transistor conducting, and feedback means interconnecting said third transistor with the other transistor of the pair for energizing the other of said pair of switching resistors into conducting condition responsively to the third switching transistor being rendered conductive, whereby all of said transistors are normally nonconducting and are rendered conducting responsively to an incoming pulse.

2. A transistor pulse stretching circuit comprising: a first transistor switch means having a pair of separately energizable input terminals and an output terminal for entering into conduction upon either input terminal receiving energization, a second transistor switch means, means interconnecting said first and second transistor switch means in mutual feedback relation and responsive to conduction of said first switch means for rendering said second switch means into conduction, and responsive to said second switch means being rendered conducting for producing a pulse in feedback to one terminal of said pair of input terminals, and in a direction to maintain said first switch means conducting, said interconnecting means including an integrating bias means interconnecting said first and second switch means and responsive to continued conduction of said first switch means for progressively biasing said second switch means in a direction to cease conduction after a predetermined time interval, and means for applying an input trigger pulse to the other of said pair of input terminals to initiate operation of said circuit, means for maintaining the leading edge and trailing edge of said pulse substantially vertical, said means comprising a differentiating circuit included in said means interconnecting said first and second switch means for differentiating the leading edge and trailing edge of said pulse, and the addition of means for automatically resetting said integrating circuit after said predetermined time interval.

3. In the circuit of claim 2, a pair of output terminals for simultaneously producing output pulses of opposite polarity during said predetermined interval, one of said output terminals being connected to said second switch means for producing said feedback pulse at that terminal, and the other of said output terminals being connected to said resetting means for producing a like pulse of opposite polarity.

4. In the circuit of claim 3, said resetting circuit comprising a third transistor switch means.

5. A monostable square wave pulse stretching circuit comprising a first transistor switch means, a second transistor switch means and a third transistor switch means, feedback means for interconnecting said first and second switch means in mutual feedback with both switch means normally being nonconducting and responsive to an input pulse to become both conductive, said feedback means including an integrating means interconnecting said first and second switches and being energized by said first switch means upon said first switch means becoming conductive to produce a progressively increasing bias potential to render said second switch means initially conductive and then nonconductive after a predetermined time interval, said feedback means also including means interconnecting said second and first transistor switch means and being responsive to said second transistor switch means becoming conductive to maintain said first transistor switch means conductive and being responsive to said second transistor switch means becoming nonconductive to render said first transistor switch means nonconductive, and said third switch means being energized into nonconductive condition upon said first switch means becoming conductive and being energized into conduction condition when said first switch means is again nonconductive to reset said integrating means.

6. In the circuit of claim 5, said integrating means comprising a capacitor and said third switch means providing a discharge circuit for said capacitor.

7. A monostable square wave pulse producing circuit comprising: a first transistor switch means of one conductivity type, a second transistor switch means of the opposite conductivity type, means for normally biasing both transistor switch means into nonconducting condition, feedback means including a timing capacitor being responsive to the first transistor switch means becoming conducting for rendering the second transistor switch means conducting for a fixed time interval controlled by the timing capacitor, second feedback means interconnecting said second transistor switch means and said first transistor switch means to maintain said first transistor switch means conducting when said second transistor switch means is conducting and to return said first transistor switch means to its initial nonconducting condition when said second transistor switch means becomes nonconducting, and means including a third transistor switch means responsive to said first transistor switch means for discharging said capacitor timing means when the first transistor switch means is rendered nonconducting.

8. A monostable square wave pulse producing circuit comprising: a first transistor switch means of one conductivity type, a second transistor switch means of the opposite conductivity type, means for normally biasing both transistor switch means into nonconducting condition, feedback means including a timing capacitor being responsive to the first transistor switch means becoming conducting for rendering the second transistor switch means conducting for a fixed time interval controlled by the timing capacitor, second feedback means interconnecting said second transistor switch means and said first transistor switch means to maintain said first transistor switch means conducting when said second transistor switch means is conducting and to return said first transistor switch means to its initial nonconducting condition when said second transistor switch means becomes nonconducting, said first transistor switch means comprising a pair of transistors each having primary current conducting electrodes and a control electrode, with the primary current conducting electrodes of the pair of transistors being interconnected in parallel, said second transistor switch means comprising a transistor having primary current conducting electrodes and a control electrode, said feedback means interconnecting a primary current electrode of the first transistor switch means to the control electrode of the second transistor switch means, and said second feedback means interconnecting a primary current electrode of the second transistor switch means with a control electrode of one of the pair of transistors of the first transistor switch means.

9. In the apparatus of claim 8, said first feedback means containing said timing capacitor in series circuit connection between said primary current electrode of the first transistor switch means and said control electrode of the second transistor switch means.

10. A monostable square wave pulse producing circuit comprising: a first transistor switch means of one conductivity type, a second transistor switch means of the opposite conductivity type, means for normally biasing both transistor switch means into nonconducting condition, feedback means including a timing capacitor being responsive to the first transistor switch means becoming conducting for rendering the second transistor switch means conducting for a fixed time interval controlled by the timing capacitor, second feedback means interconnecting said second transistor switch means and said first transistor switch means to maintain said first transistor switch means conducting when said second transistor switch means is conducting and to return said first transistor switch means to its initial nonconducting condition when said second transistor switch means becomes nonconducting, and a resetting circuit for said timing capacitor, said resetting circuit including a third transistor switch means in short circuit relationship to said timing capacitor and being controlled in response to the said first transistor switch means being rendered nonconducting to discharge said timing capacitor.

11. A square wave pulse producing circuit comprising: a first transistor switch means, a second transistor switch means, means interconnecting first and second transistor switch means in mutual feedback relationship and biasing said first and second transistor switch means normally both in a nonconducting condition, said mutual feedback interconnection means including a first path including a timing capacitor that is responsive to said first transistor switch means being rendered conductive to render said second transistor switch means conductive until said timing capacitor receives a predetermined charge and then automatically rendering said second transistor switch means nonconductive, said mutual feedback connection means including a second path that is responsive to the second transistor switch means being rendered conductive to maintain said first transistor switch means conductive and being responsive to second switch transistor means being nonconductive to render said first transistor switch means nonconductive, means for applying a triggering impulse to said first transistor switch means to initiate said first transistor switch means into a conducting condition, and means responsive to said first transistor switch means being rendered nonconductive to discharge said timing capacitor.

References Cited by the Examiner

UNITED STATES PATENTS

| | | | |
|---|---|---|---|
| 2,837,663 | 6/58 | Walz | 307—88.5 |
| 2,937,291 | 5/60 | Harper | 307—88.5 |
| 3,040,189 | 6/62 | Cramer | 307—88.5 |
| 3,113,217 | 12/63 | Huang et al. | 307—88.5 |
| 3,121,802 | 2/64 | Palmer | 307—88.5 |
| 3,167,757 | 1/65 | D'Aquila. | |

OTHER REFERENCES

Brode et al.: "Monostable Trigger," in IBM Technical Disclosure Bulletin, vol. 4, No. 5, dated October 1961, page 65.

ARTHUR GAUSS, *Primary Examiner.*